United States Patent [19]

Seitz

[11] 4,102,880
[45] Jul. 25, 1978

[54] BENZOYLATED DEHYDROTHIO-P-TOLUIDINE SULFONIC ACID-AZO-PYRIDONE DYES

[75] Inventor: Karl Seitz, Oberwil, Switzerland

[73] Assignee: Ciba-Geigy Corporation, Ardsley, N.Y.

[21] Appl. No.: 794,286

[22] Filed: May 5, 1977

[30] Foreign Application Priority Data

May 21, 1976 [CH] Switzerland .................. 6446/76

[51] Int. Cl.² .................. C09B 29/36; D06P 1/06; D06P 3/16; D06P 3/24
[52] U.S. Cl. .................. 260/156; 260/294.8 F; 260/294.9; 260/295 AM; 260/296 R; 260/297 Z
[58] Field of Search .................. 260/156, 158

[56] References Cited

U.S. PATENT DOCUMENTS

| 3,884,899 | 5/1975 | Leng et al. .................. 260/146 R |
| 3,933,787 | 1/1976 | Moser .................. 260/158 |

FOREIGN PATENT DOCUMENTS

| 883,019 | 5/1953 | Fed. Rep. of Germany ....... 260/154 |
| 2,403,736 | 8/1974 | Fed. Rep. of Germany ....... 260/156 |
| 1,344,000 | 10/1970 | United Kingdom ................. 260/154 |

*Primary Examiner*—Floyd D. Higel
*Attorney, Agent, or Firm*—Edward McC. Roberts; Michael W. Glynn; Prabodh I. Almaula

[57] ABSTRACT

Azo dyes of the formula

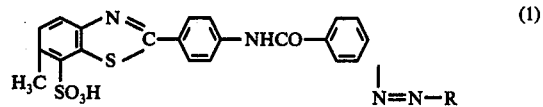

(1)

wherein R is the radical of a coupling component of the pyridine or pyridone series are disclosed; said dyes having brilliant greenish-yellow shades, high substantivity, good lightfastness and fastness to water, and suitable for dyeing and printing materials such as silk, leather, wood, polyamide, polyurethanes and cellulosic material of fibrous structure.

3 Claims, No Drawings

BENZOYLATED DEHYDROTHIO-P-TOLUIDINE SULFONIC ACID-AZO-PYRIDONE DYES

The present invention provides azo dyes of the formula

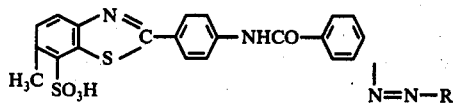

(1)

wherein R is the radical of a coupling component of the pyridine or pyridone series.

The azo bridge in formula (1) is bound to the benzene ring in the meta- or para-position to the bridge member —NHCO—.

The radical R is preferably the radical of a pyridine or pyridone which couples in the 3- or 5-position respectively and contains further substituents. In particular, R is the radical of a hydroxypyridine (or aminopyridine) or of a hydroxypyridone (or aminopyridone).

The azo dyes of the formula

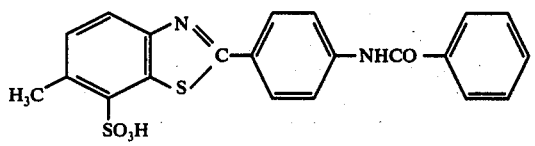

(2)

wherein $R_1$ is a hydrogen atom or an alkyl group, $R_2$ is a hydrogen atom, a cyano group, a chlorine atom, a sulpho, carbamoyl or sulphoalkyl group, and $R_3$ is an alkyl group, constitute a preferred embodiment of the azo dyes of the formula (1).

Possible alkyl groups $R_1$ and $R_3$ are in particular those having 1 to 4 carbon atoms, for example: methyl, ethyl, propyl, isopropyl, butyl, isobutyl, sec.-butyl, tert.-butyl. A sulphoalkyl group $R_2$ is for example the α-sulphoethyl and, in particular, the sulphomethyl group.

The azo dyes of the formula (1) are prepared by diazotising compounds of the formula

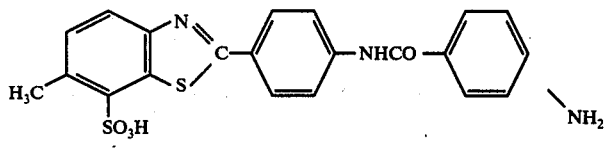

(3)

and coupling them to coupling components which contain the radical R defined in formula (1).

Coupling components which contain the radical R defined in formula (1) are preferably those of the formula

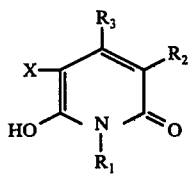

(4)

wherein $R_1$ is a hydrogen atom or an alkyl group, $R_2$ is a hydrogen atom, a cyano group, a chlorine atom, a sulpho, carbamoyl or sulphoalkyl group, $R_3$ is an alkyl group, and X is a hydrogen atom or a carbamoyl group, in which latter case a carbamoyl group X is split off under the reaction conditions, so that a coupling in the 5-position (or 3-position) of the pyridine or pyridone of the formula (4) takes place.

The starting compounds of the formula (3) are known. They are prepared by acylating the 2-p-aminophenyl-6-methylbenzthiazole-7-sulphonic acid (dehydrothio-p-toluidinesulphonic acid) of the formula

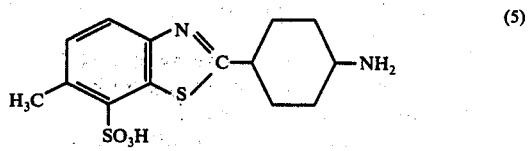

(5)

with meta- or para-nitrobenzoylchloride and reducing the resultant nitrobenzoylamino compounds to give the corresponding aminobenzoylamino compounds.

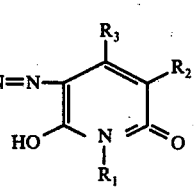

A large number of coupling components of the pyridine and pyridone series are known. Examples of coupling components belonging to the hydroxypyridine or -pyridone and aminopyridine or -pyridone series are:
3-cyano-4-methyl-2,6-dihydroxy-pyridine,
3-cyano-4-ethyl-2,6-dihydroxy-pyridine,
1,4-dimethyl-3-cyano-6-hydroxypyridone-(2),
1-ethyl-3-cyano-4-methyl-6-hydroxy-pyridone-(2),
1-ethyl-3-carbamoyl-4-methyl-6-hydroxy-pyridone-(2),
1,4-dimethyl-3-carbamoyl-6-hydroxy-pyridone-(2),
3-carbamoyl-4-methyl-2,6-dihydroxy-pyridine,
1-ethyl-3-chloro-4-methyl-6-hydroxy-pyridone-(2),
1-ethyl-3-sulphomethyl-4-methyl-6-hydroxy-pyridone-(2),
1-ethyl-3-sulphomethyl-4-methyl-5-carbamoyl-6-hydroxy-pyridone-(2),
1-ethyl-3-sulpho-4-methyl-6-hydroxy-pyridone-(2),
1-cyclohexyl-3-cyano-4-methyl-6-hydroxy-pyridone-(2),
1-n-propyl-3-carbamoyl-4-methyl-6-hydroxy-pyridone-(2),
1-ethyl-3-carbamoyl-4-(4'-methoxy-3'-sulphophenyl)-6-hydroxy-pyridone-(2),
1-ethyl-3-nitro-4-methyl-6-hydroxy-pyridone-(2),
1-ethyl-3-acetylamino-4-methyl-6-hydroxy-pyridone-(2), 1-β-aminoethyl-3-cyano-4-methyl-6-hydroxy-pyridone-(2),
1-phenyl-3-sulphomethyl-4-methyl-6-hydroxy-pyridone-(2),
1-β-hydroxyethyl-3-cyano-4-methyl-6-hydroxy-pyridone-(2),
1-isopropyl-3-cyano-4-methyl-6-hydroxy-pyridone-(2),
1-ethyl-3-chloroacetylamino-methyl-4-methyl-6-hydroxy-pyridone-(2),
1-ethyl-3-cyano-4-sulphomethyl-6-hydroxy-pyridone-(2),
1-phenyl-4-methyl-6-hydroxy-pyridone-(2),
3-sulphomethyl-4-methyl-2,6-dihydroxy-pyridine,
3-sulphomethyl-4-methyl-5-carbamoyl-2,6-dihydroxy-pyridine,
1-ethyl-4-methyl-6-hydroxy-pyridone-(2),
4-sulphomethyl-2,6-dihydroxy-pyridine,
2,4,6-triamino-3-cyano-pyridine,
2-(3'-sulphophenylamino)-4,6-diamino-3-cyano-pyridine,
2-(2'-hydroxyethylamino)-3-cyano-4-methyl-6-aminopyridine,
2,6-bis-(2'-hydroxyethylamino)-3-cyano-4-methyl-pyridine.

The diazotisation of the compounds of the formula (3) is effected as a rule by treatment with nitrous acid in an aqueous mineral acid solution, and the coupling is carried out with the coupling components of the pyridine or pyridone series at weakly acid or neutral to weakly alkaline pH values.

The pyridine or pyridone radicals shown in the formulae (2), (4), (6) and (8) can exist in several tautomeric forms. For the sake of simplicity, these radicals are shown in the formulae in only one of these tautomeric forms. However, explicit attention is drawn to the fact that the description, the Examples and the claims always refer to any one of these tautomeric forms.

The dyes of the formula (1) are characterised by brilliant greenish-yellow shades, high substantivity, good lightfastness and fastness to waste water.

The dyes of the present invention are suitable for dyeing and printing a wide variety of materials, such as silk, leather, wool, polyamide fibres and polyurethanes, and especially cellulosic material of fibrous structure, such as linen, cellulose, regenerated cellulose, cotton and, above all, paper. They are suitable both for the exhaustion process and for dyeing by the pad-dyeing process, in which the goods are impregnated with aqueous and, as the case may be, also with salt-containing, dye solutions.

The dyes of the formula (1) are also suitable for printing, in particular on cotton and paper, and also for printing nitrogen-containing fibres, for example wool, silk, or blends which contain wool.

The invention is illustrated by the following Examples in which the parts are by weight.

EXAMPLE 1

With vigorous stirring, a solution of 22.2 parts of 4-nitrobenzoylchloride in 50 parts of acetone is added dropwise at room temperature in the course of approx. 2 hours to a neutral solution of 32 parts of dehydrothio-p-toluidinesulphonic acid in 500 parts of water, while keeping the pH of the reaction mixture between 7.5 and 8.5 by the simultaneous dropwise addition of 2N sodium hydroxide solution. The acylation is brought to completion by heating the reaction mixture to 75° C and after approx. half an hour the nitro group is reduced by adding a solution of 14.04 parts of sodium sulphide in 50 parts of water of 60° C. A clear solution forms temporariliy and then the aminobenzoylated dehydrothio-p-toluidinesulphonic acid begins to precipitate. After approx. half an hour the batch is cooled and the reaction product is isolated by filtration and washed with a 15% sodium chloride solution. Then 43.9 parts of the aminobenzoylated dehydrothio-p-toluidinesulphonic acid are suspended in 500 parts of water and 30 parts of 10N hydrochloric acid and stirred together with 25 parts of 4N sodium nitrite solution for several hours at 35°-40° C. To the suspension of the diazonium compound is then added a neutral solution of 29 parts of 1-ethyl-3-sulphomethyl-4-methyl-5-carbamoyl-6-hydroxy-pyridone-(2) in 300 parts of water. The pH of the coupling mixture is adjusted to 7 in the course of 2 hours by the dropwise addition of 2N sodium hydroxide solution. When the coupling is complete, the viscous dye solution is poured into a solution of 50 parts of potassium acetate in 1000 parts of methyl alcohol. The precipitated dye is filtered off and dried in vacuo. The product dyes cotton and paper in brilliant greenish-yellow shades of good light-fastness.

EXAMPLE 2

A similar dye is obtained by using 26.2 parts of 3-sulphomethyl-4-methyl-5-carbamoyl-2,6-dihydroxy-pyridine instead of the coupling component of Example 1.

Further similar dyes are obtained by diazotising the amines listed in column I of the following table and coupling them to the pyridine or pyridone coupling components listed in column II.

| I | II |
|---|---|
| N-(4'-aminobenzoyl)-dehydrothiotoluidinesulphonic acid | 3-carbamoyl-4-methyl-2,6-dihydroxy-pyridine |
| " | 1-ethyl-3-cyano-4-methyl-6-hydroxy-pyridone-(2) |
| N-(3'-aminobenzoyl)-dehydrothiotoluidinesulphonic acid | 1-ethyl-3-sulphomethyl-4-methyl-5-carbamoyl-6-hydroxy-pyridone-(2) |
| " | 3-sulphomethyl-4-methyl-5-carbamoyl-2,6-dihydroxy-pyridine |
| " | 3-carbamoyl-4-methyl-2,6-dihydroxy-pyridine |
| N-(4'-aminobenzoyl)-dehydrothiotoluidinesulphonic acid | 1-ethyl-4-methyl-6-hydroxy-hydroxy-pyridone-(2) |
| N-(4'-aminobenzoyl)-dehydrothiotoluidinesulphonic acid | 3-sulphomethyl-4-methyl-2,6-dihydroxy-pyridine |
| " | 3-cyano-4-methyl-2,6-dihydroxy-pyridine |
| N-(3'-aminobenzoyl)-dehydrothiotoluidinesulphonic acid | 1-phenyl-4-methyl-6-hydroxy-pyridone-(2) |
| " | 1-ethyl-4-methyl-6-hydroxy-pyridone-(2) |
| " | 1,4-dimethyl-3-cyano-6- |

(6)

[Chemical structure diagram]

| I | II |
|---|---|
| N-(4'-aminobenzoyl)-dehydro-thiotoluidinesulphonic acid | hydroxy-pyridone-(2) 3-cyano-4-ethyl-2,6-dihydroxy-pyridine |
| " | 1-ethyl-3-carbamoyl-4-methyl-6-hydroxy-pyridone-(2) |
| " | 1,4-dimethyl-3-carbamoyl-6-hydroxy-pyridone-(2) |
| " | 1-ethyl-3-chloro-4-methyl-6-hydroxy-pyridone-(2) |
| " | 1-ethyl-3-sulphomethyl-4-methyl-6-hydroxy-pyridone-(2) |
| N-(4'-aminobenzoyl)-dehydro-thiotoluidinesulphonic acid | 1-ethyl-3-sulpho-4-methyl-6-hydroxy-pyridone-(2) |
| " | 1-cyclohexyl-3-cyano-methyl-6-hydroxy-pyridone-(2) |
| " | 1-n-propyl-3-carbamoyl-4-methyl-6-hydroxy-pyridone-(2) |
| " | 1-ethyl-3-carbamoyl-4-(4'-methoxy-3'-sulphophenyl)-6-hydroxy-pyridone-(2) |
| N-(3'-aminobenzoyl)-dehydro-thiotoluidinesulphonic acid | 1-ethyl-3-nitro-4-methyl-6-hydroxy-pyridone-(2) |
| " | 1-ethyl-3-acetylamino-4-methyl-6-hydroxy-pyridone-(2) |
| " | 1-β-aminoethyl-3-cyano-4-methyl-6-hydroxy-pyridone-(2) |
| " | 1-phenyl-3-sulphomethyl-4-methyl-6-hydroxy-pyridone-(2) |
| N-(3'-aminobenzoyl)-dehydro-thiotoluidinesulphonic acid | 1-β-hydroxyethyl-3-cyano-4-methyl-6-hydroxy-pyridone-(2) |
| " | 1-isopropyl-3-cyano-4-methyl-6-hydroxy-pyridone-(2) |
| " | 1-ethyl-3-chloroacetylamino-methyl-4-methyl-6-hydroxy-pyridone-(2) |
| " | 1-ethyl-3-cyano-4-sulpho-methyl-6-hydroxy-pyridone-(2) |

DYEING EXAMPLES

Example 1

PRINTING PAPER 800 kg of bleached sulphate cellulose and 200 kg of bleached sulphite cellulose are charged, as supplied, into a pulper which contains 14 m³ of production water and impacted until the pulp is free from specks. The impacting procedure last 30 minutes. The impacted pulp is thereafter discharged into a discharge vat. From the discharge vat the pulp suspension is beaten to a fineness of 25° SR and subsequently conveyed to a mixing vat. To the mixing vat are further added 250 kg of kaolin Ia (as filler) and 1% of dye, based on the weight of absolutely dry fibres, in the form of an aqueous solution of 20 g/l. After an exhaustion time of 15 minutes, 2% of resin size (absolutely dry) and after 10 minutes 4% of alum (both based on the weight of absolutely dry cellulose), are added. The pulp suspension has a pH of 5.3 and is conveyed to the paper machine by means of the procedure commonly employed in the paper industry.

Example 2

TISSUE PAPER 1000 g of bleached sulphate cellulose are charged, as supplied, into a pulper which contains 14 m³ of production water and impacted until the pulp is free from specks. The impacting procedure last 30 minutes and thereafter the pulp is emptied into a discharge vat. From the discharge vat the pulp is beaten to a fineness of 25° C SR and subsequently conveyed to a mixing vat, to which 1% of dye, based on the weight of absolutely dry fibres, is added in the form of an aqueous solution of 20 g/l. The pulp suspension has a pH of 7. After an exhaustion time of 15 minutes, this pulp is conveyed to the paper machine by means of the procedure commonly employed in the paper industry.

Example 3

SIZE PRESS APPLICATION 5 kg of dye are dissolved in 1000 liters of a 10% anionic starch solution and applied by means of a size press. The application of the above solution is 1.5 g/m², absolutely dry, per page.

I claim:

1. An azo dye of the formula

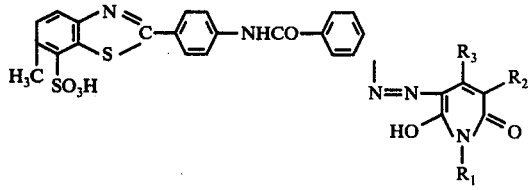

wherein $R_1$ is hydrogen, alkyl, cyclohexyl, β-aminoethyl or β-hydroxyethyl;

$R_2$ is hydrogen, cyano, chloro, sulfo, carbamoyl, sulfoalkyl, nitro, acetylamino or chloroacetylaminomethyl; and $R_3$ is alkyl, 4'-methoxy-3'-sulfophenyl, or sulfomethyl.

2. An azo dye according to claim 1, wherein $R_1$ is hydrogen or alkyl, $R_2$ is hydrogen, cyano, chloro, sulfo, carbamoyl or sulfoalkyl, and $R_3$ is alkyl.

3. The azo dye according to claim 1 of the formula

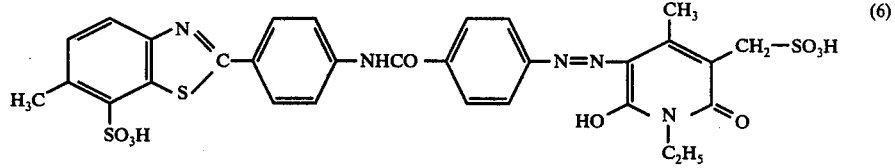

(6)

* * * * *